United States Patent
Wada

(10) Patent No.: US 9,568,596 B2
(45) Date of Patent: Feb. 14, 2017

(54) OPTICAL DISTANCE MEASURING APPARATUS AND ELECTRONIC APPARATUS

(71) Applicant: SHARP KABUSHIKI KAISHA, Osaka-shi, Osaka (JP)

(72) Inventor: Hideo Wada, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 269 days.

(21) Appl. No.: 14/416,333

(22) PCT Filed: Jul. 1, 2013

(86) PCT No.: PCT/JP2013/068009
§ 371 (c)(1),
(2) Date: Jan. 22, 2015

(87) PCT Pub. No.: WO2014/017256
PCT Pub. Date: Jan. 30, 2014

(65) Prior Publication Data
US 2015/0260829 A1    Sep. 17, 2015

(30) Foreign Application Priority Data

Jul. 24, 2012 (JP) .................................. 2012-163867

(51) Int. Cl.
*G01C 3/08* (2006.01)
*G01S 7/481* (2006.01)
(Continued)

(52) U.S. Cl.
CPC ................ *G01S 7/481* (2013.01); *G01C 3/24* (2013.01); *G01S 7/4813* (2013.01); *G01S 17/08* (2013.01); *G01S 17/48* (2013.01)

(58) Field of Classification Search
CPC ............ G01C 3/24; G01S 17/08; G01S 17/48; G01S 7/481; G01S 7/4813
(Continued)

(56) References Cited

U.S. PATENT DOCUMENTS 6,046,795 A    4/2000 Sugiyama et al.
6,337,736 B1    1/2002 Sugiyama et al.
(Continued)

FOREIGN PATENT DOCUMENTS

JP     11-281351 A    10/1999
JP     2001-99643 A    4/2001
(Continued)

*Primary Examiner* — Mark Hellner
(74) *Attorney, Agent, or Firm* — Birch, Stewart, Kolasch & Birch, LLP

(57) ABSTRACT

Provided are an optical distance measuring apparatus, which is capable of accurately measuring a distance, whatever the temperature may be, and which can be easily manufactured at low cost, and an electronic apparatus mounted with the optical distance measuring apparatus. A lead frame of the optical measuring apparatus has two or more first reinforcing terminals, each of which has a part extending in a direction substantially orthogonal to a direction in which a connecting part between a light emitting header and a light receiving header extends. The first reinforcing terminals are fixed by a first light blocking resin body and connected to the light receiving header.

7 Claims, 16 Drawing Sheets

(51) Int. Cl.
*G01S 17/48* (2006.01)
*G01C 3/24* (2006.01)
*G01S 17/08* (2006.01)

(58) Field of Classification Search
USPC .......................................................... 356/4.01
See application file for complete search history.

(56) References Cited

U.S. PATENT DOCUMENTS

| | | | | |
|---|---|---|---|---|
| 2002/0084432 | A1* | 7/2002 | Sugiyama | G01S 7/4811 |
| | | | | 250/559.38 |
| 2004/0263824 | A1* | 12/2004 | Yamamoto | G01C 3/08 |
| | | | | 356/3.14 |
| 2007/0210267 | A1* | 9/2007 | Ishii | G01S 17/48 |
| | | | | 250/559.36 |
| 2013/0292706 | A1* | 11/2013 | Costello | H01L 31/167 |
| | | | | 257/82 |

FOREIGN PATENT DOCUMENTS

| | | | |
|---|---|---|---|
| JP | 2006-337320 A | 12/2006 | |
| JP | 2012-37276 A | 2/2012 | |

* cited by examiner 320  330

350

450

440

OPTICAL DISTANCE MEASURING APPARATUS AND ELECTRONIC APPARATUS

TECHNICAL FIELD

The present invention relates to an optical distance measuring apparatus, or optical ranging apparatus, for optically detecting a distance to an object, and an electronic apparatus equipped with the same and particularly, to an optical distance measuring apparatus capable of increasing a ranging accuracy when the apparatus is subject to expansion/contraction due to temperature changes and absorption of moisture and an electronic apparatus equipped with the same. Also, the present invention relates to, for example, a reflowable optical distance measuring apparatus and an electronic apparatus equipped with the same.

BACKGROUND ART

FIG. 8 shows a conventional optical distance measuring apparatus. This apparatus is configured to receive reflected light of a spot light applied to an object to be measured and measure the distance to the object by trigonometry or triangulation.

Specifically, a light beam emitted from a light emitting element 101 placed on a datum point, or origin, O is converted to a generally parallel light beam by a light emitting lens 102 placed on point A(0, d), which beam impinges on an object to be measured 103 at point B(0, y) as a spot light. The light beam reflected by the object 103 is condensed by a light receiving lens 104, placed on point C(L, d), is focused onto point D(L+1, 0) on a position detecting element (e.g., PSD: Position Sensitive Detector) 106 placed on the x axis, and thereby forms a received light spot.

Given that a line passing through the point C, i.e., the center of the light receiving lens, and being parallel to the y axis intersects the x axis at point E(L, 0), a triangle ABC is homothetic to a triangle ECD. Accordingly, a distance y to the object to be measured 103 can be found through detection of a position of the received light spot by the position detecting element 106, followed by measurement of a side ED (=1) and calculation of the equation below according to the principle of the trigonometry or triangulation.

$$y = \frac{L \cdot d}{l} \quad (1)$$

A PSD, a linear sensor having a plurality of photodiodes, an image sensor, or the like is used as the position detecting element 106 to detect the position of an optical center of gravity of the received light spot projected onto the position detecting element 106. In FIG. 8, reference numeral 108 represents an axis of emitted light and 109 represents an axis of received light.

However, it is only when the inter-lens distance L and the distance d between the position detecting element and the light receiving lens are fixed that the distance to the object can be accurately determined by equation (1) above. In general, in optical distance measuring apparatuses, light emitting and receiving lenses are fixed or secured by a casing made of a light blocking resin for the purpose of cost reduction.

Resins used for the casing to secure the lenses generally have a large thermal expansion coefficient. Therefore, when the ambient temperature changes, the resin casing expands or contracts, resulting in changing of the inter-lens distance L. As a result, there arises a problem that, as shown in FIG. 9, broken lines indicating the optical axes at the time of measurement are shifted from solid lines indicating the optical axes at the time of room temperature so that the position of the received light spot at the time of measurement is shifted from the position of the received light spot at the time of room temperature toward the outside, in spite that the object to be measured remains positioned at the same distance. As a result, for example, when the temperature rises, the object will be found to be at a smaller distance than it is. In FIG. 9, reference numeral 201 indicates a lead frame, 202 indicates a light emitting element, 203 indicates a light receiving element, 204 indicates a signal processing IC, 205 indicates a light permeable resin, 206 indicates a light blocking resin, 207 and 208 indicate windows, 209 indicates a light emitting lens, 210 indicates a light receiving lens, 211 indicates a casing, 212 indicates a light blocking wall, and 213 indicates an object to be measured.

In order to avoid such a problem, in an optical distance measuring apparatus shown in FIG. 10, which is disclosed in PTL 1 listed below, a light emitting system consisting of a light emitting element and a light emitting lens and a light receiving system consisting of a light receiving element and a light receiving lens are connected to each other by a flexible material. In this way, a positional relationship between the light emitting and receiving elements and the light emitting and receiving lenses are maintained even when the thermal expansion occurs such that accuracy in distance measurement is maintained.

Also, in an optical distance measuring apparatus shown in FIG. 11, which is disclosed in PTL 2 listed below, a same material is used for a holding member for light receiving elements, a holding member for lenses, and a connecting member for connecting the holding members. The entire structure is thereby allowed to be evenly expandable, so that a decrease in distance measurement accuracy due to temperature changes is prevented.

However, the solutions employed in those optical distance measuring apparatuses are intended to maintain the positional relationship among the lenses and the light emitting and receiving elements so as to satisfy the principle of trigonometry or triangulation when the entire apparatus is uniformly subject to a temperature change due to a change in ambient temperature, and not intended to maintain such positional relationship when the light emitting and/or receiving element per se produces heat due to energization of these elements.

On the other hand, an optical distance measuring apparatus shown in FIG. 12, which is disclosed in PTL 3 listed below, has a temperature sensor for measuring the temperature of the holding member for the lenses and a temperature sensor for measuring the temperature of the holding member for the light receiving elements in order to compensate for the self-heating of the light receiving elements. In this apparatus, based on output from those temperature sensors, thermal expansion of the components of the apparatus due to self-heating after the energization of the light receiving elements is detected so that the accuracy in distance measurement, or ranging accuracy, is maintained.

However, this optical distance measuring apparatus requires the temperature sensor for measuring the temperature of the holding member for the light receiving elements and the temperature sensor for measuring the temperature of the holding member for the light receiving lenses, which is a problem. These temperature sensors cannot be incorporated in the light emitting elements. Instead, they have to be individually placed in contact with the respective holding members. This arrangement makes the configuration of the apparatus complicated and also requires wiring for taking in outputs from the temperature sensors. As a result, the optical distance measuring apparatus has a comparatively complicated structure. This may lead to an increased number of assembling steps and difficulty in providing a distance measuring apparatus at low cost.

Accordingly, the present inventor made an optical distance measuring apparatus shown in FIGS. 13A and 13B, which is disclosed in PTL 4 listed below, in which the light emitting and receiving lenses are formed on a plate (of, for example, 42 alloy) and the plate is integrated with a base body including the light emitting and receiving elements and a light blocking wall, in order to improve temperature characteristics of the apparatus due to the ambient heat. Further, in this optical distance measuring apparatus, a light emitting header mounted with the light emitting element is connected with a light receiving header mounted with the light receiving element by a lead frame, as shown in FIG. 14, to suppress the expansion of a spacing or distance between the light emitting element and the light receiving element caused by self-heating of the elements and thereby improve the temperature characteristics due to self-heating.

CITATION LIST

Patent Literature

PTL 1: JP 2006-337320 A
PTL 2: JP H11-281351 A
PTL 3: JP 2001-99643 A
PTL 4: JP 2012-37276 A

SUMMARY OF THE INVENTION

Technical Problem

However, when reflowing the optical distance measuring apparatus of PTL 4, because the ambient temperature rises to about 260° C., though for a short time, the resin that forms the package of the apparatus tends to greatly expand. At this time, expansion between the light emitting and receiving lenses and between the light emitting and receiving elements can be suppressed, because they are connected through a lens frame and a lead frame. However, expansion of the package in a height direction cannot be suppressed.

At this time, the lens frame is prevented from being deformed by stress generated by the expansion because the lens frame is planar except for the regions of the light emitting and receiving lenses, as shown in FIGS. 13A and 13B, and has a sufficient area. However, because the lens frame is not connected with anything at its periphery, it is easily deformed and warped by the stress due to expansion of the package.

This will be described in detail below. FIGS. 15A-15D show the optical distance measuring apparatus of PTL 4 during the production process, each figure showing a sectional view of structures of the apparatus in different process steps. In the process of producing the optical distance measuring apparatus, the light emitting element 301 and the light receiving element 302 are mounted on the lead frame 300, as shown in FIG. 15A, and then molded or sealed with respective light permeable resin 305, 306 as shown in FIG. 15B. In parallel with the above process, light emitting lens 309 and a light receiving lens 310 are formed of a light permeable resin on the lens frame 306, as shown in FIG. 15C. A primary molded body formed in the step of FIG. 15B is then insert-molded, with the result that a secondary molded body 320 of light blocking resin is obtained, as shown in FIG. 15D.

As shown in FIG. 15D, the secondary molded body 320 is formed with a light blocking wall 330 at a central portion to prevent or block light from the light-emitting element from directly entering the light receiving element. The lens frame formed with the lenses as shown in FIG. 15C is mounted on the secondary molded body 320, as shown in FIG. 15E. Then, the assembly shown in FIG. 15E is further insert molded to form a tertiary molded body 350. In this way, the optical distance measuring apparatus is produced.

FIG. 16A is a top view of FIG. 15B, in which the lead frame is seen through the primary mold. FIG. 16B is a top view of FIG. 15D, and FIG. 16C is a transparent view of FIG. 16B. FIG. 17A is a cross-sectional view taken along A-A' line of FIG. 16C, and FIG. 17B is a cross-sectional view taken along B-B' line of FIG. 16C. When the package expands due to high heat caused by the reflow, stress 440 is exerted as indicated by arrows in FIGS. 17A and 17B.

In this situation, because the lens frame has the flat or planar portion of a relatively large area, as explained above, the lens frame is resistant to stress even when thermally expanded. In contrast to the lens frame, the lead frame significantly warps when the package, particularly the central light blocking wall between the light emission and reception parts, is thermally expanded. This is because the light receiving header 450 is not fixed with respect to a direction orthogonal to a direction in which a part connecting the light emitting header and the light receiving header extends. As a result, when returning to a normal, or room temperature after the reflow process, the relative positional relationship between the light emitting and receiving lenses and the light receiving and emitting elements is changed from the relative positional relationship between the light emitting and receiving lenses and the light receiving and emitting elements before the reflow. As a result, as described in connection with the principle of triangulation, the spot position of the reflected light is disadvantageously shifted, meaning that the measured distance value is varied, which is a problem.

Accordingly, an object of the present invention is to provide an optical distance measuring apparatus that is capable of accurately measuring a distance, whatever the temperature may be, and that can be produced inexpensively and easily, and also to provide an electronic apparatus mounted with such an optical distance measuring apparatus.

Solution to Problem

An optical distance measuring apparatus according to the present invention includes:

a lead frame having, on a same plane, a light emitting header, a light receiving header, and a connecting part extending in one direction to connect the light emitting header with the light receiving header;

a light emitting element mounted on the light emitting header;

a light receiving element mounted on the light receiving header and configured to detect a spot position of light emitted from the light emitting element and then reflected by an object to be measured;

a light permeable resin body sealing the light emitting element and the light receiving element;

a first light blocking resin body sealing the light permeable resin body in an integral manner, the first light blocking resin body including a light blocking wall that is positioned between the light emitting element and the light receiving element;

a light emitting lens having light permeability, the light emitting lens mounted to the first light blocking resin body so as to be positioned above the light emitting element; and a light receiving lens having light permeability, the light receiving lens mounted to the first light blocking resin body so as to be positioned above the light receiving element, the lead frame having at least two first terminals which are connected to the light receiving header and extend in a direction substantially orthogonal to a direction in which the connecting part extends, and each of the first terminals being fixed, or secured, by the first light blocking resin body.

In other words, the optical distance measuring apparatus according to the present invention includes:

a light emitting element mounted on one surface of a lead frame;

a light receiving element mounted on the surface of the lead frame and configured to detect a spot position of light emitted from the light emitting element and then reflected by an object to be measured;

a light permeable resin body sealing the light emitting element and the light receiving element;

a first light blocking resin body sealing the light permeable resin body in an integral manner, the first light blocking resin body including a light blocking wall between the light emitting element and the light receiving element; and a light emitting lens and a light receiving lens each having light permeability, the light emitting and receiving lenses mounted on the first light blocking resin body, the lead frame including:

a light emitting header on which the light emitting element is mounted and a light receiving header on which the light receiving element is mounted, the light emitting header and the light receiving header being connected, or joined, to each other; and at least two first terminals connected to the light receiving header and each having a part that extends in a direction orthogonal to a direction in which a connecting part between the light emitting and receiving headers extends, each of the first terminals being fixed by the first light blocking resin body.

Because the first terminals connected to the light receiving header portion are fixed by the first light blocking resin body and the lead frame is thereby reinforced, the lead frame is prevented from warping even in a high temperature environment during the reflow process. Therefore, relative positional relationship between the light emitting and receiving elements and the light emitting and receiving lenses is prevented from varying, with a result that a highly accurate optical distance measuring apparatus is achievable.

In one embodiment, each first terminal is provided near the light blocking wall.

According to this embodiment, the first terminals each are placed in an area near the light blocking wall. Thus, the lead frame is effectively suppressed from warping in a central area between the light emitting and receiving elements where the stress due to expansion is largest.

In one embodiment, each first terminal has a part that underlaps the light blocking wall in a direction substantially orthogonal to the direction in which the connecting part extends.

According to this embodiment, the first terminals are placed in an area near the light blocking wall between the light emitting and receiving elements, which area is subject to a largest stress due to expansion, which is a factor of warpage of the lead frame. Thus, warpage of the lead frame is effectively prevented.

In one embodiment, the lead frame has at least two second terminals which are connected to the light emitting header and extend in a direction substantially orthogonal to the direction in which the connecting part extends, and each of the second terminals is fixed by the first light blocking resin body.

According to this embodiment, the two second terminals are joined to the light emitting header and extend in the same direction as the first terminals. Further the second terminals are fixed, or secured, by the first light blocking resin body. That is, in addition to the first terminals joined to the light receiving header, the second terminals joined to the light emitting header are fixed by the first light blocking resin body. Therefore, warpage of the lead frame is prevented more effectively.

In one embodiment, the lead frame has a third terminal which is connected to the light receiving header and which extends, on one side of the light receiving header opposite from the light emitting header, substantially in the direction in which the connecting part extends, and the third terminal is fixed by the first light blocking resin body.

According to this embodiment, the lead frame has the third terminal connected to the light receiving header on one side of the light receiving header opposite from the light emitting header, and the third terminal is fixed by the first light blocking resin body. That is, the light receiving header is connected to the third terminal which extends in a direction orthogonal to the direction in which the first terminals extend, and this third terminal is secured by the first light blocking resin body. Therefore, the lead frame is reinforced better, with the result that warpage of the lead frame is prevented more effectively.

In one embodiment, the lead frame has a fourth terminal which is connected to the light emitting header and which extends, on one side of the light emitting header opposite from the light receiving header, substantially in the direction in which the connecting part extends, and the fourth terminal is fixed by the first light blocking resin body.

According to this embodiment, the lead frame has the fourth terminal connected to the light emitting header on one side of the light emitting header opposite from the light receiving header, and the fourth terminal is fixed by the first light blocking resin body. That is, the light emitting header is connected to the fourth terminal which extends in a direction orthogonal to the direction in which the first terminals extend, and this fourth terminal is secured by the first light blocking resin body. Therefore, the lead frame is reinforced better, with the result that warpage of the lead frame is prevented more effectively.

Also, an electronic apparatus according to the present invention includes the optical distance measuring apparatus of the present invention.

With the optical distance measuring apparatus incorporated in a device such as a personal computer (PC), a sanitary device, etc., it is possible to control the device by accurately detecting a distance to a person, whatever the temperature may be. If the optical distance measuring apparatus is incorporated in a self-travelling cleaner, it is possible to accurately detect obstacles and steps whatever the temperature may be. If the optical distance measuring apparatus is used as a non-contact switch or a non-contact controller, it is possible to accurately control electronic apparatuses whatever the temperature may be.

Advantageous Effects of Invention

According to the present invention, it is possible to achieve an optical distance measuring apparatus that can perform distance measurement or ranging more accurately whatever the temperature may be and that can be produced inexpensively and easily, and also an electronic apparatus mounted with such an optical distance measuring apparatus.

DESCRIPTION OF EMBODIMENTS

Figure 1A:
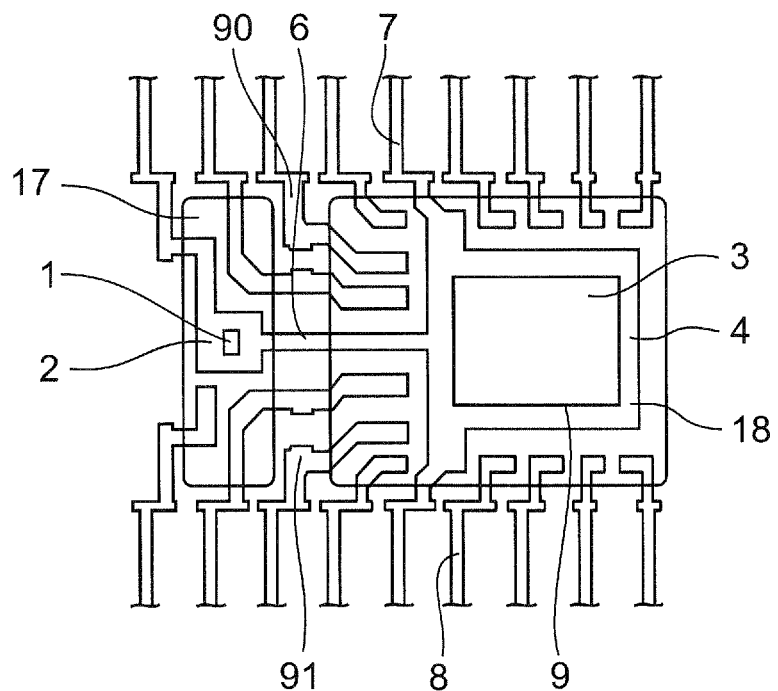
FIG. 1A is a transparent view of a primary molded body which is obtained after a primary molding step in the production process of an optical distance measuring apparatus of a first embodiment of the present invention.

The present invention will be described below by embodiments shown in the drawings.

Figure 1B:
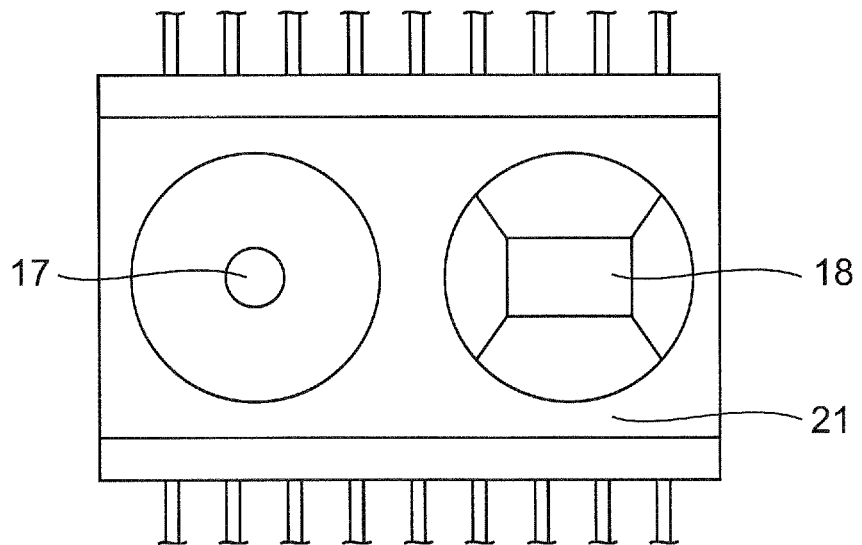
FIG. 1B is a top view of a structure of the optical distance measuring apparatus in process of production after a secondary molding step following the step of FIG. 1A.
Figure 1C:
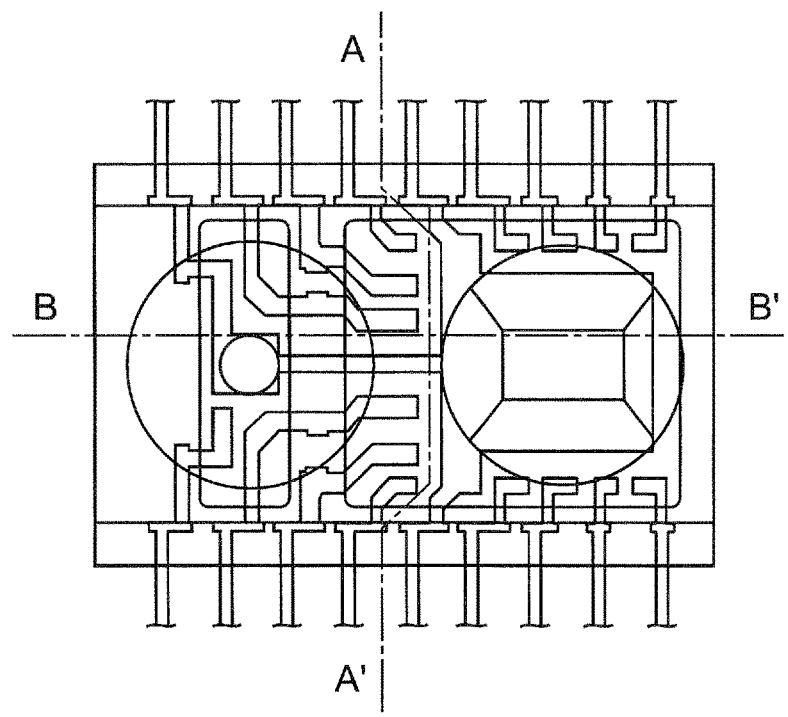
FIG. 1C is a transparent view of FIG. 1B.

FIGS. 1A-1C show plan views of an optical distance measuring apparatus of a first embodiment of the present invention. Cross-sectional views of structures in production process steps in the present embodiment are same as the cross-sectional views shown in FIGS. 15A-15F. More specifically, FIG. 1A is a transparent view of a primary molded body obtained after the primary molding process. As shown in FIG. 1A, in the optical distance measuring apparatus, a light emitting header 2 mounted with a light emitting element 1 is connected, or joined with a light receiving header 4 mounted with a light-receiving element 3, which makes it possible to prevent expansion of the interval or spacing between the light emitting and receiving elements 1 and 3 resulting from expansion of the package due to influence of the temperature and humidity. Arranged on opposite sides of a connecting part 6 of the light emitting and receiving headers 2 and 4 are first reinforcing terminals 7 and 8 as first terminals which extend in opposite directions generally orthogonal to a direction in which the connecting part 6 of the light emitting and receiving headers 2 and 4 extends. The first reinforcing terminals 7 and 8 are joined to the light receiving header 4.

FIG. 1B is a top view of a structure of the optical distance measuring apparatus in process of production after a secondary molding step following the step of FIG. 1A, and FIG. 1C shows a transparent view of FIG. 19. Further, FIG. 2A is a sectional view taken along line A-A' of FIG. 1C and FIG. 2B is a sectional view taken along line B-B' of FIG. 1C.

Figure 2A:
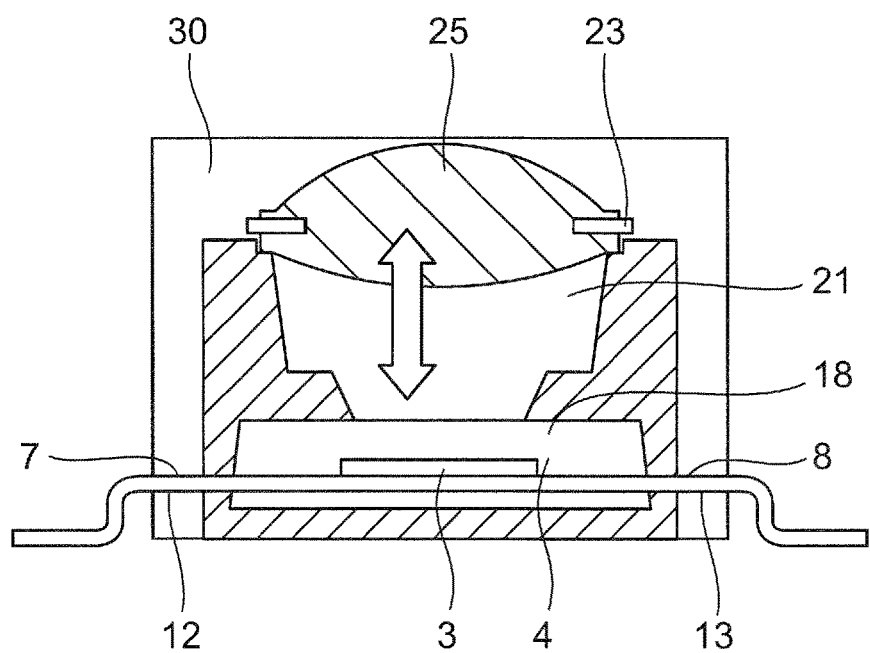
FIG. 2A is a sectional view taken along line A-A' of FIG. 1C.

In this embodiment, as shown in FIG. 2A, the first reinforcing terminals 7 and 8 are connected, or joined to the light receiving header 4, and are taken out to the outside of the package. Also, each of the first reinforcing terminals 7, 8 has a fixed portion 12, 13. These fixed portions 12 and 13 are fixed by the secondary molding. In addition, as shown in FIGS. 1B and 2B, a light emission side primary molded body (a light permeable resin body) 17 is covered with a light blocking secondary molded body (a first light blocking resin body) 21, except for a region in which a light beam emitted from the light emitting element 1 goes out. A light reception side primary molded body (a light permeable resin body) 18 is also covered with the light blocking secondary molded body (the first light blocking resin body) 21, except for a region in which a reflected light beam enters. Placed above the secondary molded body 21 is a lens frame 23 formed of a metal such as 42 alloy. A light emitting lens 29 (see FIG. 2B) formed of a light permeable resin and a light receiving lens 25 formed of a light permeable resin are formed on the lens frame 23.

Further, as shown in FIG. 2A, the lens frame 23 with the lenses 25, 29 and the secondary molded body 21 are covered with a tertiary molded body (a second light blocking resin body) 30 formed of a light blocking resin so as to be fixed.

Figure 2B:
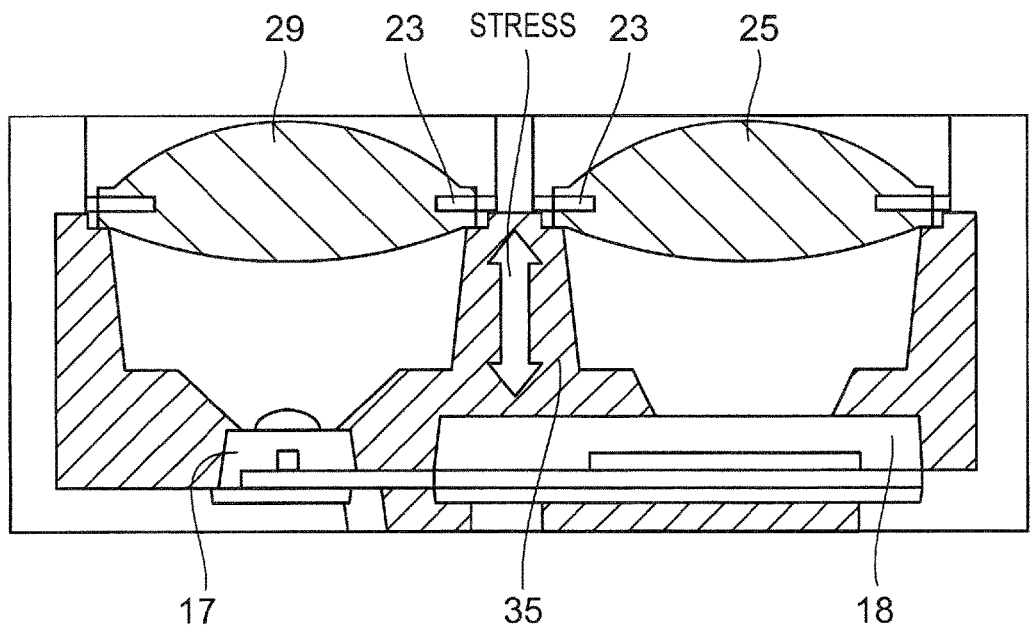
FIG. 2B is a sectional view taken along line B-B' of FIG. 1C.

As shown in FIG. 2B, at the time of reflow, a light blocking wall 35 between the light receiving and emitting parts is expanded significantly, so that stress tends to act in the directions indicated by arrows in the figure. However, in this embodiment, as shown in FIG. 2A, the light receiving header 4 is fixed by the secondary molded body 21 through the first reinforcing terminals 7 and 8, a lead frame 9 (see FIG. 1A) is prevented from warping. Therefore, even after reflow, it is possible to prevent relative positional relationship between the light emitting and receiving elements 1 and 3 and the light emitting and receiving lens 25 and 29 from being shifted, as a result of which a measured distance value is prevented from being changed after the reflow.

In addition, referring to FIGS. 1A and 2B, each of the first reinforcing terminals 7 and 8 has a portion 90, 91 which underlays the light blocking wall 35 in a direction substantially orthogonal to the extending direction of the connecting part 6. In this way, the first reinforcing terminals 7 and 8 are placed in an area near the light blocking wall 35 between the light emitting and receiving elements 1 and 3, which area is subject to a largest stress due to the expansion, which is a factor of warpage of the lead frame 9. As a result of the provision of the first reinforcing terminals 7 and 8, warpage of the lead frame 9 is effectively prevented. In this embodiment, the first reinforcing terminals 7 and 8 are placed so as to underlap the light blocking wall 35 generally orthogonally to the direction in which the connecting part 6 extends, but only have to be placed near the light blocking wall to effectively prevent the warpage of the lead frame.

Figure 3A:
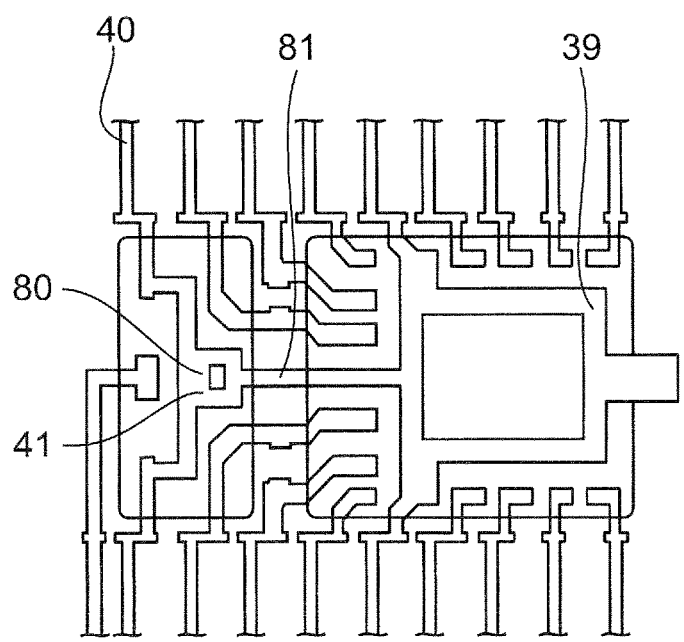
FIG. 3A is a transparent view of a structure obtained after a primary molding step in the production process of an optical distance measuring apparatus of a second embodiment of the present invention.
Figure 3B:
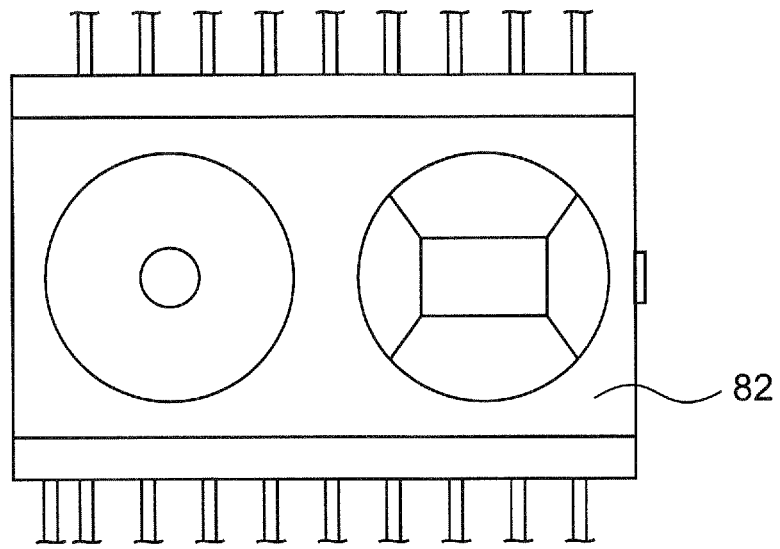
FIG. 3B is a top view of a structure of the optical distance measuring apparatus in process of production after a secondary molding step following the step of FIG. 3A.
Figure 3C:
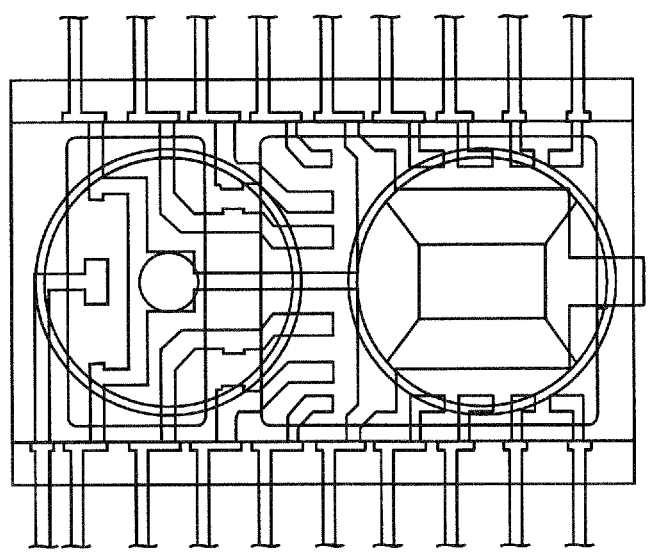
FIG. 3C is a transparent view of the structure of FIG. 3B.

FIGS. 3A-3C are plan views of an optical distance measuring apparatus according to a second embodiment of the present invention. More specifically, FIG. 3A is a transparent view of a structure obtained after a primary molding step, FIG. 3B is a top view of a structure after a secondary molding step following the step of FIG. 3A, and FIG. 3C is a transparent view of the structure of FIG. 3B. In the second embodiment, description is focused on features in which the second embodiment differs from the first embodiment.

As shown in FIG. 3A, in the second embodiment, a lead frame 80 has a plurality of second reinforcing terminals 40 as second terminals. After the primary molding process, the plurality of second reinforcing terminals 40 extend in a direction substantially orthogonal to a direction of extension of a connecting part 81 of light receiving and emitting headers 39 and 41. Each second reinforcing terminal 40 is joined to the light emitting header 41. In the second embodiment, in addition to the light receiving header 39, the light emitting header 41 is also fixed by a secondary molded part 82 (see FIG. 3B) as the first light blocking resin body.

According to the second embodiment, it is possible to further prevent warping due to the expansion of the package caused by reflow.

Figure 4A:
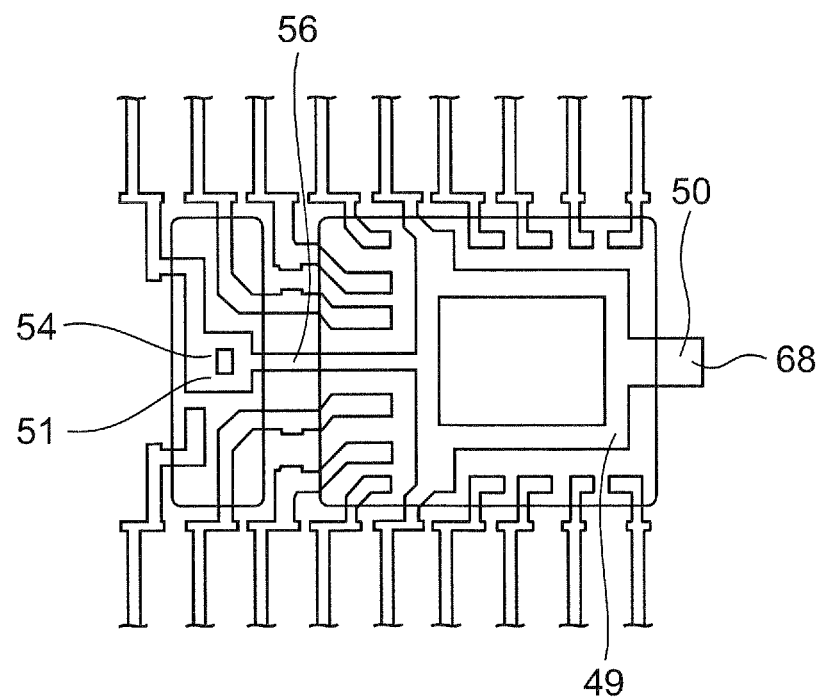
FIG. 4A is a transparent view of a structure obtained after a primary molding step in the production process of an optical distance measuring apparatus of a third embodiment of the present invention.
Figure 4B:
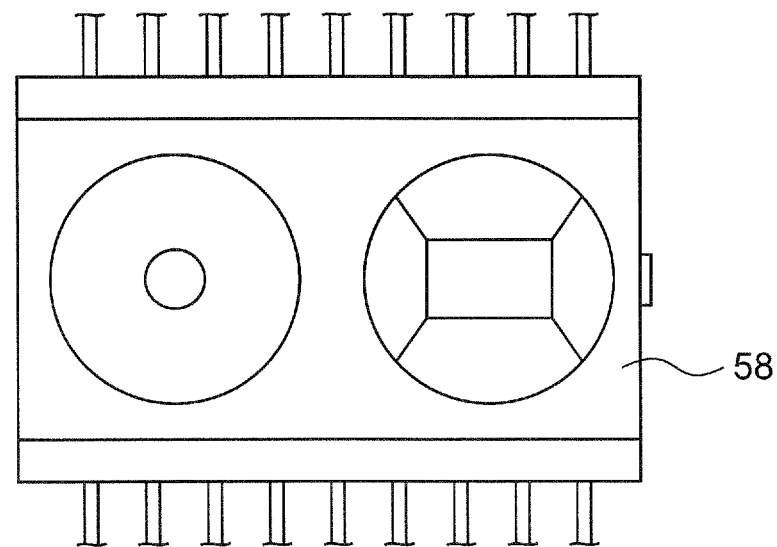
FIG. 4B is a top view of a structure of the optical distance measuring apparatus in process of production after a secondary molding step following the step of FIG. 4A.
Figure 4C:
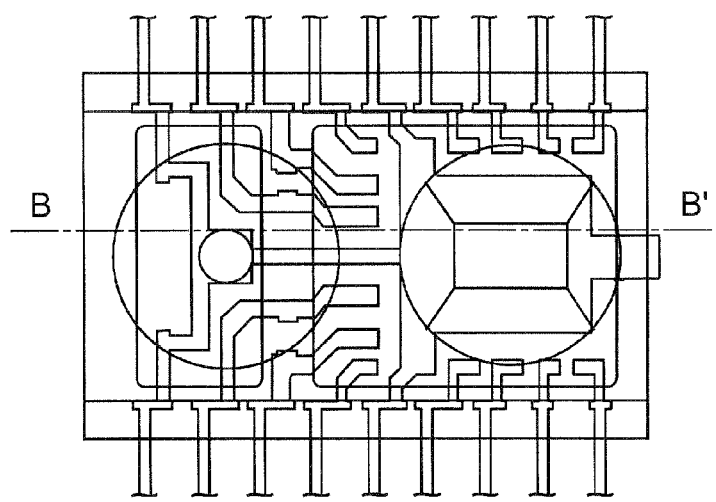
FIG. 4C is a transparent view of the structure of FIG. 4B.

FIGS. 4A-4C are plan views of an optical distance measuring apparatus according to a third embodiment of the present invention. More specifically, FIG. 4A is a transparent view of a structure obtained after a primary molding step, FIG. 4B is a top view of a structure after a secondary molding step following the step of FIG. 4A, and FIG. 4C is a transparent view of the structure of FIG. 4B. In the third embodiment, description is focused on features in which the third embodiment differs from the first embodiment.

As shown in FIG. 4A, in the third embodiment, a lead frame 54 has a third reinforcing terminal 50 as a third terminal. The third reinforcing terminal 50 extends substantially in a direction in which a connecting part 56 between a light receiving header 49 and a light emitting header 51 extends. The third reinforcing terminal 50 has an extended portion 68 on one side of the light receiving header 49 opposite from the light emitting header 51. The third reinforcing terminal 50 is joined to the light receiving header 49.

Figure 5:
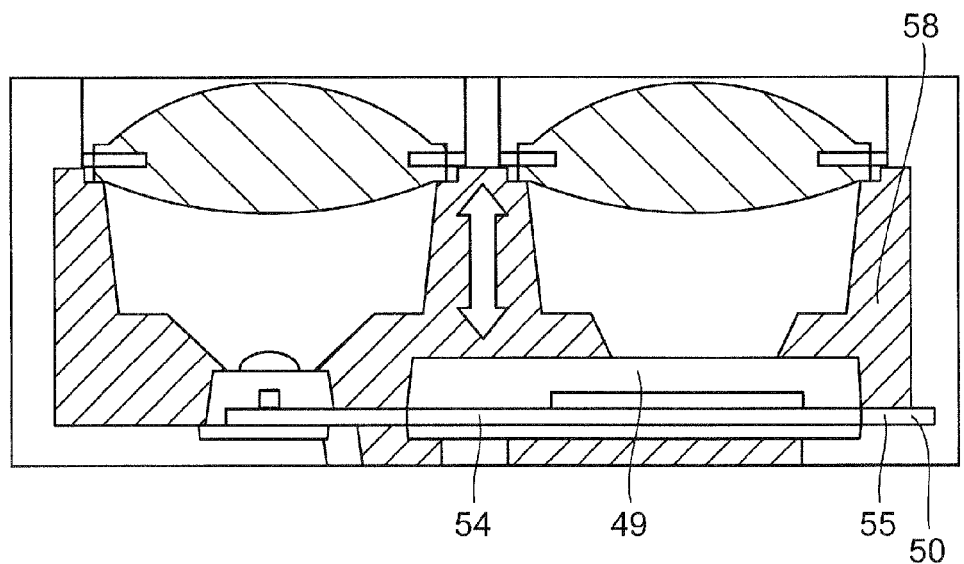
FIG. 5 is a sectional view taken along line B-B' of FIG. 4C.

FIG. 5 is a sectional view taken along line B-B' of FIG. 4C. As shown in FIG. 5, the third reinforcing terminal 50 includes a fixed portion 55 fixed to a second molded body 58 as a first light blocking resin body. According to the third embodiment, the fixed portion 55 of the third reinforcing terminal 50, which is connected to the light receiving header 49, is fixed by the second molded body 58. This results in increase in the number of fixed points even at end portions of the lead frame 54. Therefore, when stress due to the package expansion acts during the reflow process, it is possible to more securely prevent the lead frame 54 from warping.

Figure 6A:
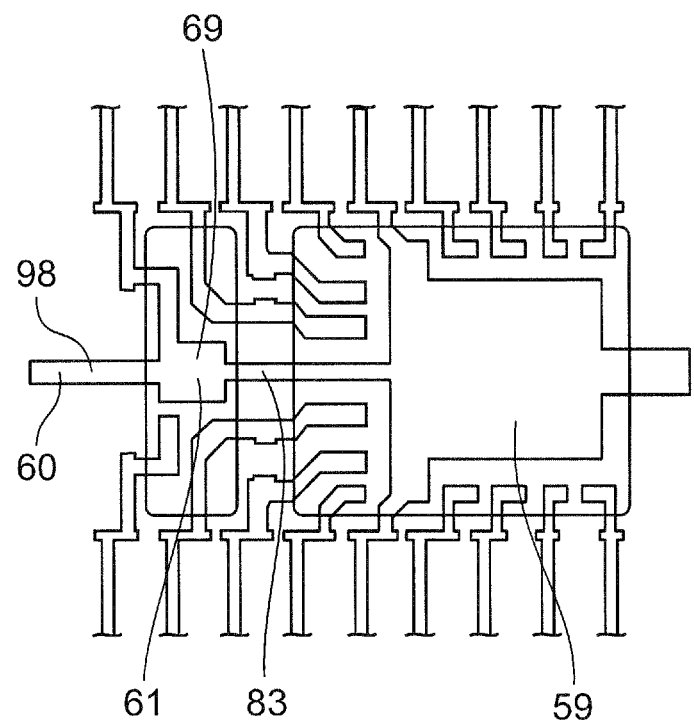
FIG. 6A is a transparent view of a structure obtained after a primary molding step in the production process of an optical distance measuring apparatus of a third embodiment of the present invention.
Figure 6B:
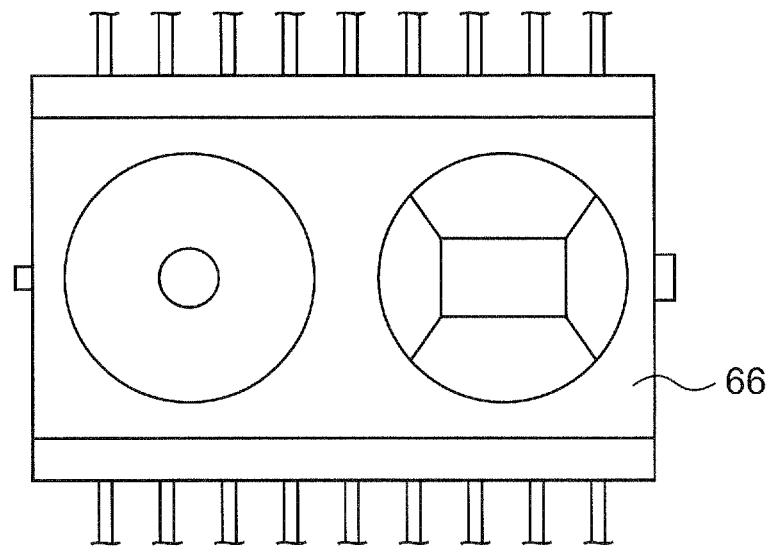
FIG. 6B is a top view of a structure of the optical distance measuring apparatus in process of production after a secondary molding step following the step of FIG. 6A.
Figure 6C:
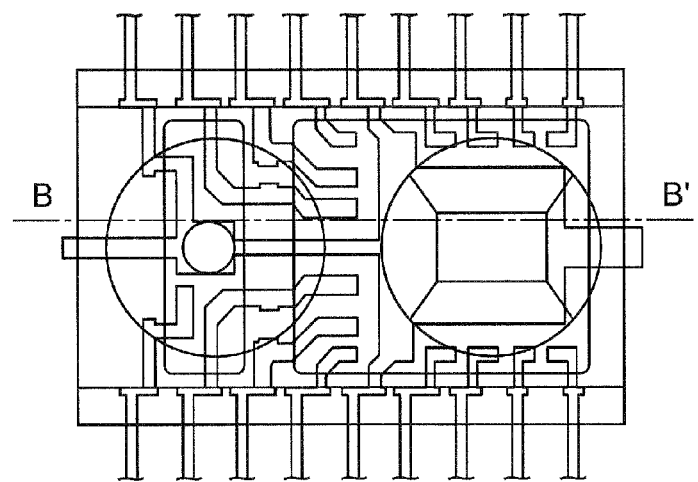
FIG. 6C is a transparent view of the structure of FIG. 6B.

FIGS. 6A-6C are plan views of an optical distance measuring apparatus of a fourth embodiment of the present invention. Specifically, FIG. 6A is a transparent view of a structure obtained after a primary molding step, FIG. 6B is a top view of a structure after a secondary molding step following the step of FIG. 6A, and FIG. 6C is a transparent view of the structure of FIG. 6B. In the fourth embodiment, description is focused on features in which the fourth embodiment differs from the first embodiment.

As shown in FIG. 6A, in the fourth embodiment, a lead frame 69 has a fourth reinforcing terminal 60 as a fourth terminal. The fourth reinforcing terminal 60 extends substantially in a direction in which a connecting part 83 between a light receiving header 59 and a light emitting header 61 extends. The fourth reinforcing terminal 60 has an extended portion 98 on one side of the light emitting header 61 opposite from the light receiving header 59. The fourth reinforcing terminal 60 is connected to the light emitting header 61.

Figure 7:
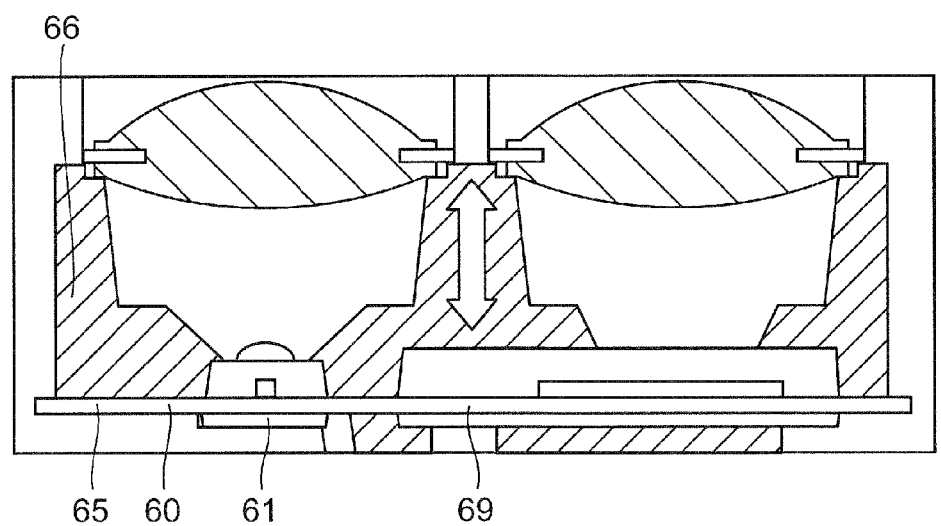
FIG. 7 is a sectional view taken along line B-B' of FIG. 6C.
Figure 8:
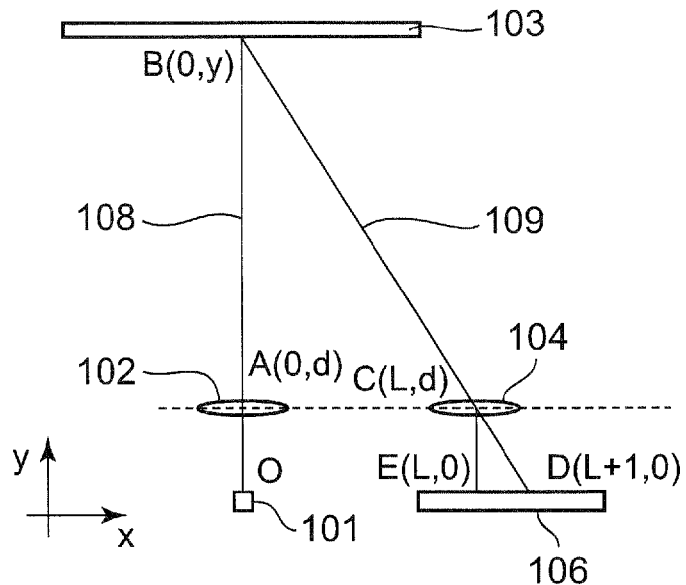
FIG. 8 is a diagram showing the principle of the optical distance measuring apparatus.
Figure 9:
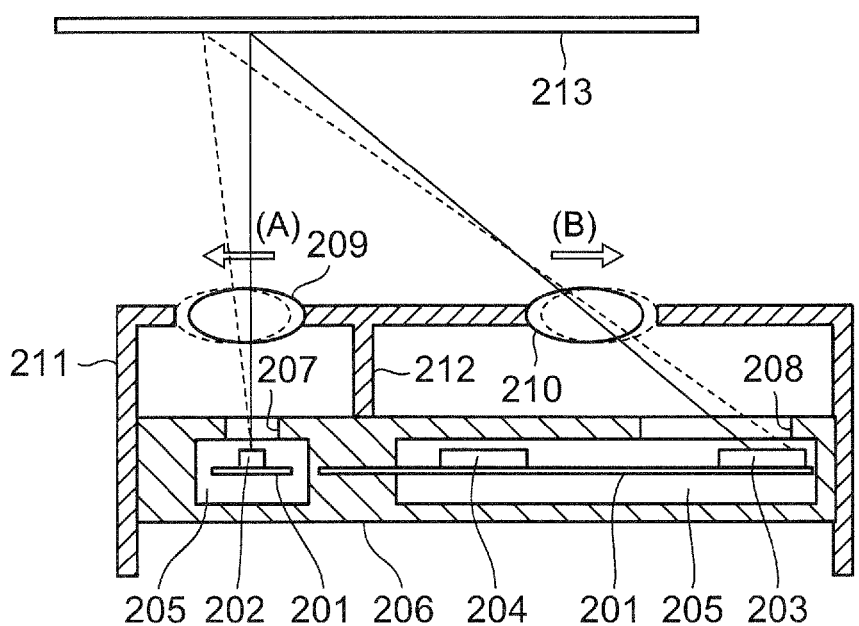
FIG. 9 is a diagram for explaining the problem due to the temperature change of the optical distance measuring apparatus.
Figure 10:
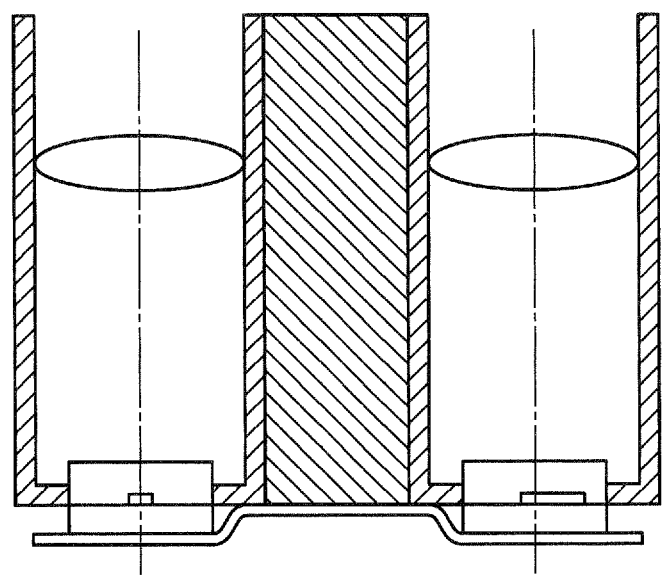
FIG. 10 shows a prior art optical distance measuring apparatus.
Figure 11:
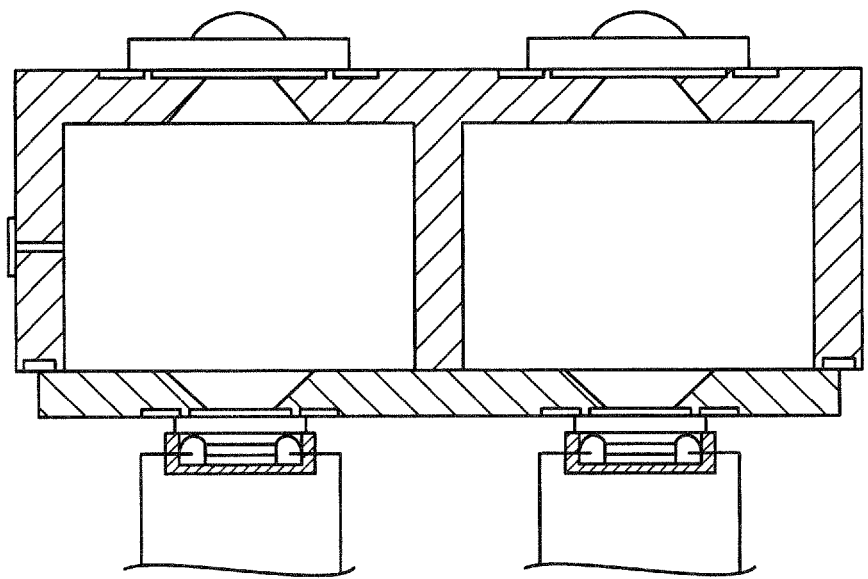
FIG. 11 shows a prior art optical distance measuring apparatus.
Figure 12:
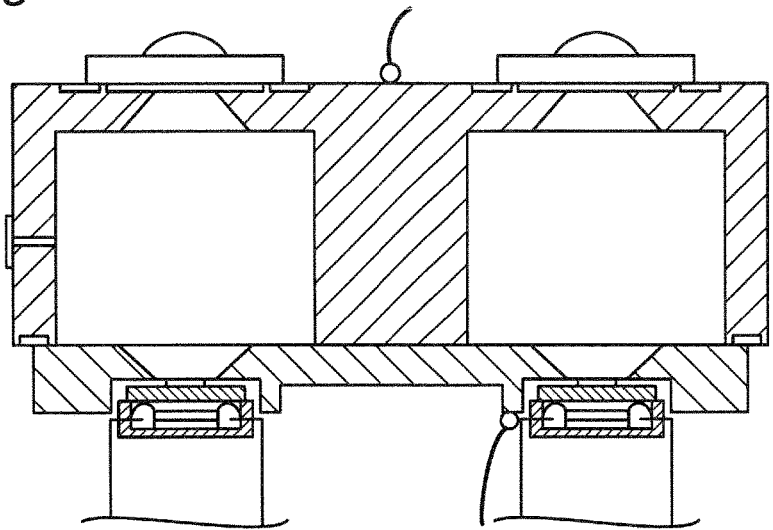
FIG. 12 shows a prior art optical distance measuring apparatus.
Figure 13A:
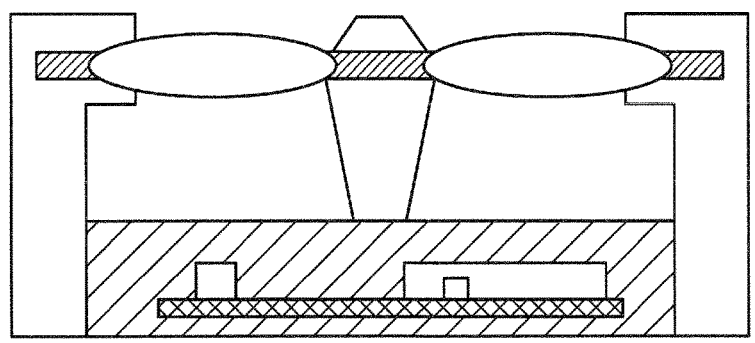
FIG. 13A shows a prior art optical distance measuring apparatus.
Figure 13B:
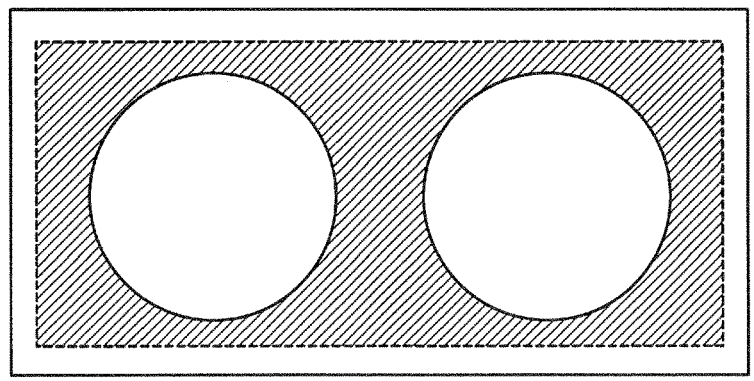
FIG. 13B shows a prior art optical distance measuring apparatus.
Figure 14:
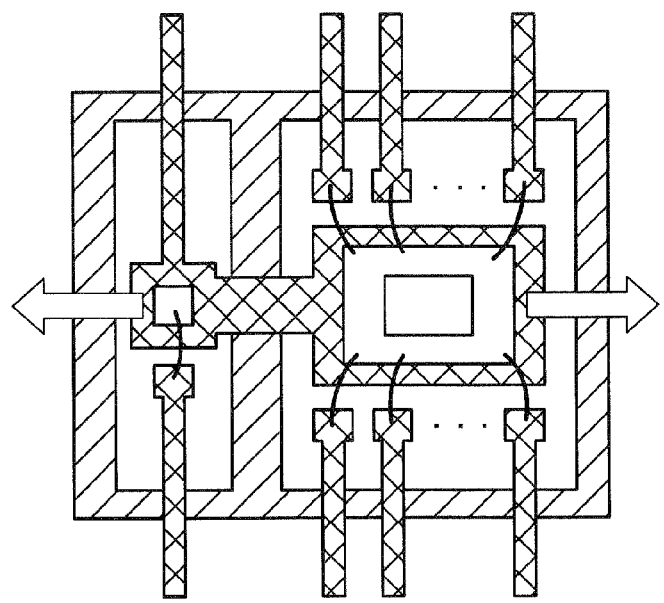
FIG. 14 shows a prior art optical distance measuring apparatus.
Figure 15A:
FIG. 15A is a sectional view for explaining a production process of a prior art optical distance measuring apparatus.
Figure 15B:
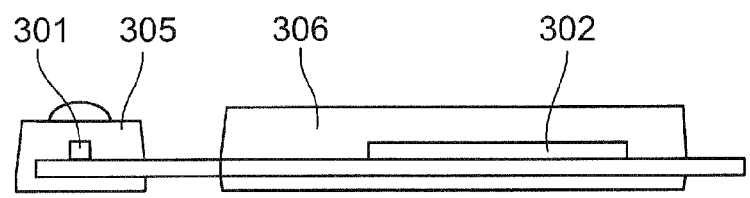
FIG. 15B is a sectional view for explaining the production process of the prior art optical distance measuring apparatus.
Figure 15C:
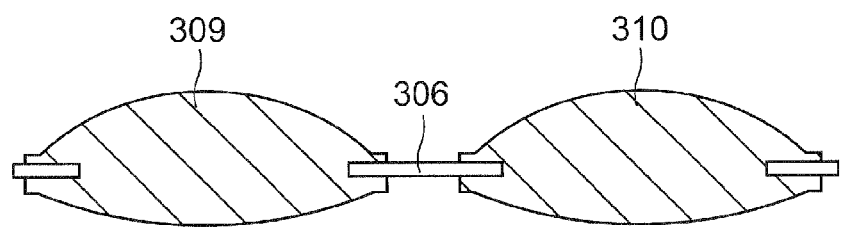
FIG. 15C is a sectional view for explaining the production process of the prior art optical distance measuring apparatus.
Figure 15D:
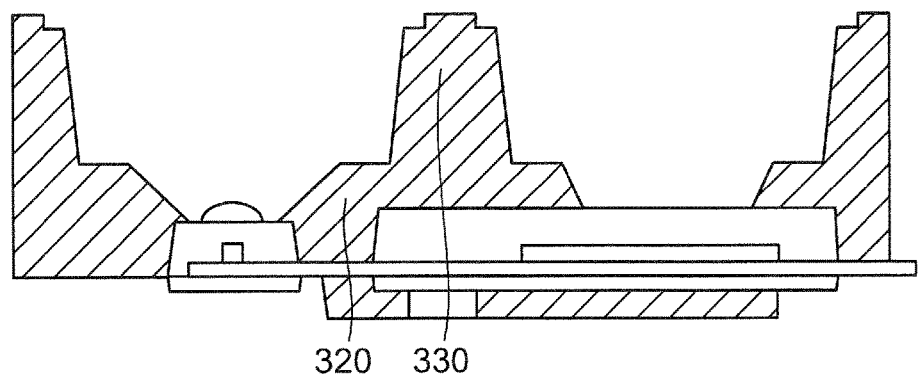
FIG. 15D is a sectional view for explaining the production process of the prior art optical distance measuring apparatus.
Figure 15E:
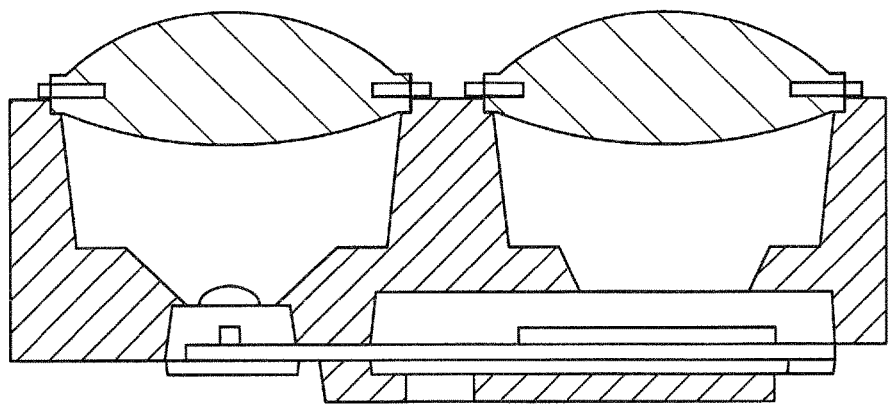
FIG. 15E is a sectional view for explaining the production process of the prior art optical distance measuring apparatus.
Figure 15F:
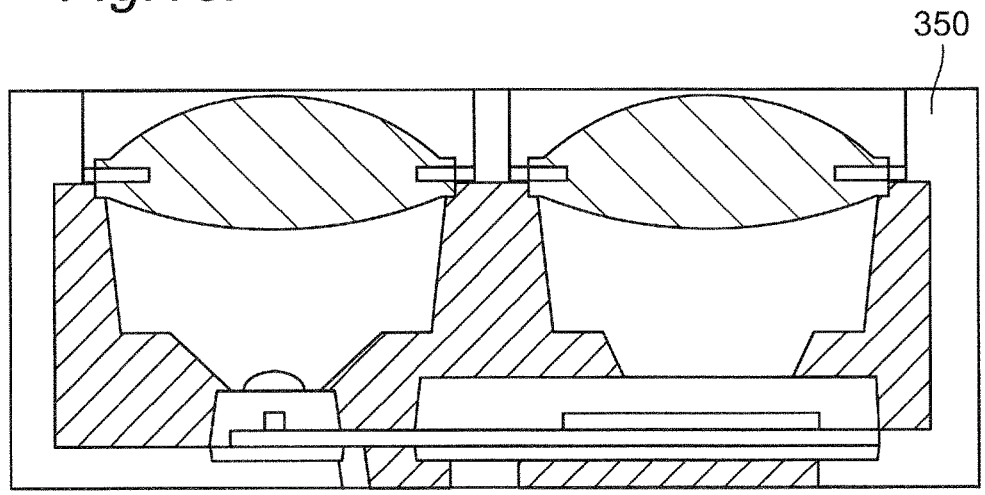
FIG. 15F is a sectional view for explaining the production process of the prior art optical distance measuring apparatus.
Figure 16A:
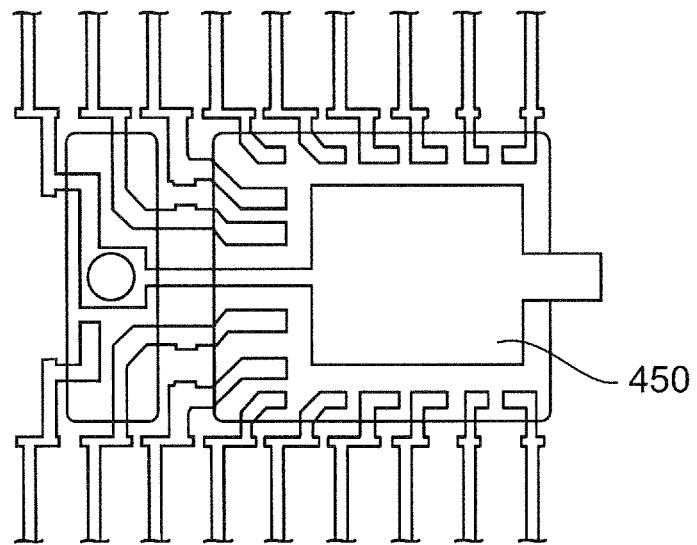
FIG. 16A is a top view of FIG. 15B.
Figure 16B:
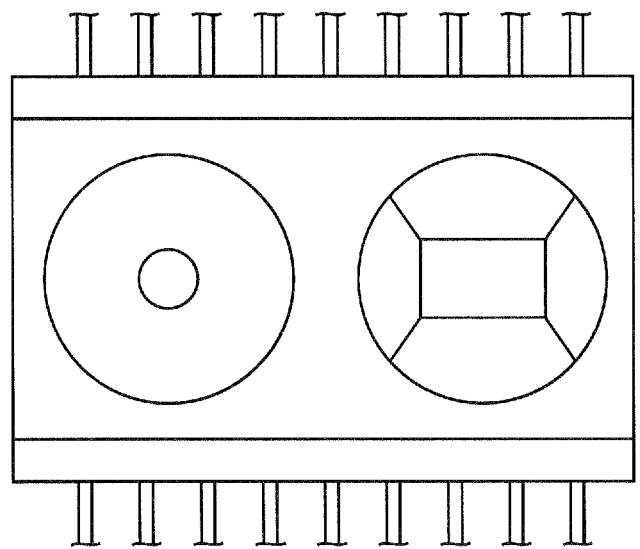
FIG. 16B is a top view of FIG. 15D.
Figure 16C:
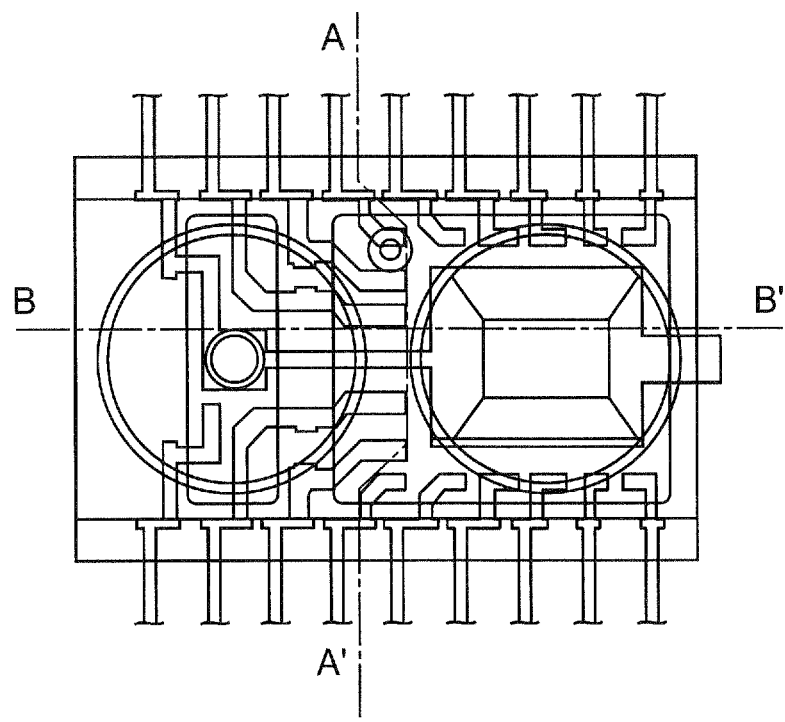
FIG. 16C is a transparent view of the structure of FIG. 16B.
Figure 17A:
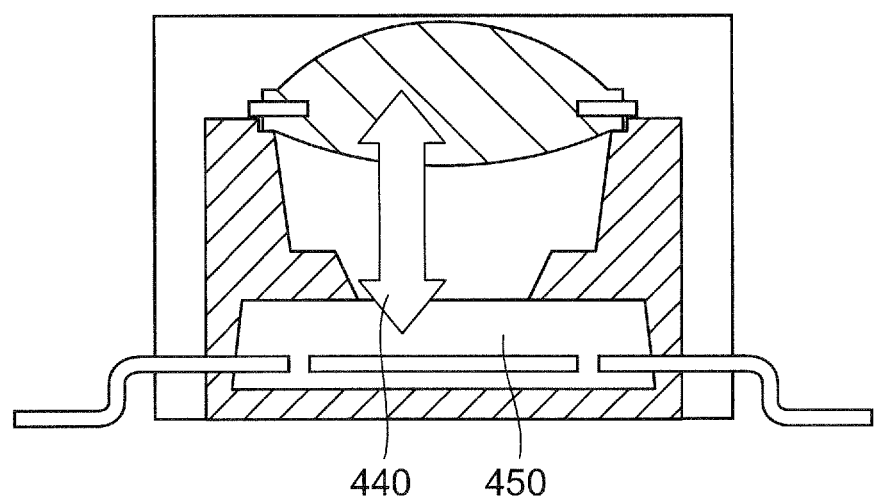
FIG. 17A is a sectional view taken along line A-A' of FIG. 16C.
Figure 17B:
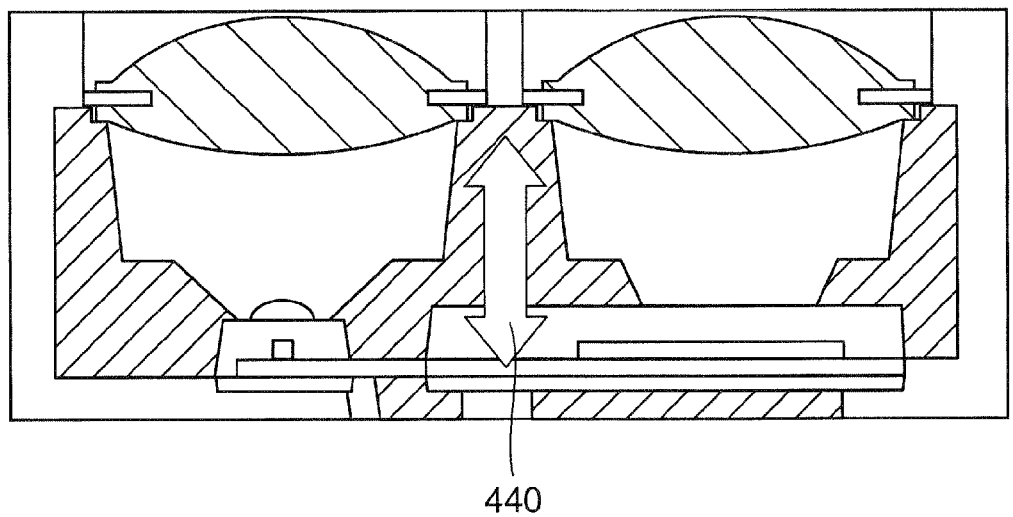
FIG. 17B is a sectional view taken along line B-B' of FIG. 16C.

FIG. 7 is a sectional view taken along line B-B' of FIG. 6C. As shown in FIG. 7, the fourth reinforcing terminal 60 includes a fixed portion 65 fixed to a second molded body 66 as a first light blocking resin body. According to the fourth embodiment, the fixed portion 65 of the fourth reinforcing terminal 60, which is connected to the light emitting header 61, is fixed by the secondary molded body 66. This results in increase in the number of fixed points even at end portions of the lead frame 69. Therefore, when stress due to the package expansion acts during the reflow process, it is possible to more securely prevent the lead frame 69 from warping.

Several embodiments of the optical distance measuring apparatus of the present invention have been described above. The optical distance measuring apparatus according to the present invention can have good performance such as an increased heat resistance performance. Also, it is possible to mount a large number of optical distance measuring apparatuses to electronic apparatuses in a short time and with ease by reflow. Therefore, if the optical distance measuring apparatus is incorporated in a personal computer (PC), it can be detected correctly whether a person is present in front of the PC. If it is detected that there is no person in front of the PC, the PC may be brought into a sleep mode. In this way, it is possible to carry out energy saving efficiently. If the optical distance measuring apparatus is incorporated in a self-travelling cleaner, it is possible to accurately detect obstacles and steps. If the optical distance measuring apparatus is incorporated in an electronic kitchen appliance, it is possible to provide a non-contact switch for making ON/OFF operations of the kitchen appliance in a non-contact manner. Furthermore, with the optical distance measuring apparatus installed in an electronic apparatus, it is possible for the electronic apparatus to accurately detect a distance to an operator's hand to perform operations such as a volume control operation in a non-contact manner. Thus, it is possible for the electronic apparatus to suitably perform such operations when the operator has wet hands or dirty hands.

It goes without saying that two or more of the first to the fourth embodiments may be combined into a new embodiment. It also goes without saying that two or more features may be picked up from all of the embodiments and the variations/modifications described herein, and combined into a new embodiment.

REFERENCE SIGNS LIST 1 light-emitting element
2, 41, 51, 61 light emitting header
3 light-receiving element
4, 39, 49, 59 light receiving header
6, 56, 81, 83 connecting part
7, 8 first reinforcing terminal
9, 54, 69, 80 lead frame
21, 58, 66, 82 secondary molded body
35 light blocking wall
40 second reinforcing terminal
50 third reinforcing terminal
55 fixed portion of the third reinforcing terminal
60 fourth reinforcing terminal
65 fixed portion of the fourth reinforcing terminal

The invention claimed is:

1. An optical distance measuring apparatus comprising:
a lead frame having, on a same plane, a light emitting header, a light receiving header, and a connecting part extending in one direction to connect the light emitting header with the light receiving header;
a light emitting element mounted on the light emitting header;
a light receiving element mounted on the light receiving header and configured to detect a spot position of light emitted from the light emitting element and then reflected by an object to be measured;
a light permeable resin body sealing the light emitting element and the light receiving element;
a first light blocking resin body sealing the light permeable resin body in an integral manner, the first light blocking resin body including a light blocking wall that is positioned between the light emitting element and the light receiving element;
a light emitting lens having light permeability, the light emitting lens mounted to the first light blocking resin body so as to be positioned above the light emitting element; and
a light receiving lens having light permeability, the light receiving lens mounted to the first light blocking resin body so as to be positioned above the light receiving element,
the lead frame having at least two first terminals which are connected to the light receiving header and extend in a direction substantially orthogonal to a direction in which the connecting part extends, and
each of the first terminals being fixed by the first light blocking resin body.

2. The optical distance measuring apparatus according to claim 1, wherein each first terminal is provided near the light blocking wall.

3. The optical distance measuring apparatus according to claim 1, wherein each first terminal has a portion that underlaps the light blocking wall in a direction substantially orthogonal to the direction in which the connecting part extends.

4. The optical distance measuring apparatus according to claim 1, wherein the lead frame has at least two second terminals which are connected to the light emitting header and extend in a direction substantially orthogonal to the direction in which the connecting part extends, and
wherein each of the second terminals is fixed by the first light blocking resin body.

5. The optical distance measuring apparatus according to claim 1, wherein the lead frame has a third terminal which is connected to the light receiving header and which extends, on one side of the light receiving header opposite from the light emitting header, substantially in the direction in which the connecting part extends, and
wherein the third terminal is fixed by the first light blocking resin body.

6. The optical distance measuring apparatus according to claim 1, wherein the lead frame has a fourth terminal which is connected to the light emitting header and which extends, on one side of the light emitting header opposite from the light receiving header, substantially in the direction in which the connecting part extends, and
wherein the fourth terminal is fixed by the first light blocking resin body.

7. An electronic apparatus comprising the optical distance measuring apparatus according to claim 1.

* * * * *